United States

Caton

[11] 3,967,878
[45] July 6, 1976

[54] OPTICAL WAVEGUIDE COUPLER
[75] Inventor: William M. Caton, San Diego, Calif.
[73] Assignee: The United States of America as represented by the Secretary of the Navy, Washington, D.C.
[22] Filed: Mar. 3, 1975
[21] Appl. No.: 554,956

[52] U.S. Cl. .......................... 350/96 C; 350/96 WG
[51] Int. Cl.² ........................................... G02B 5/14
[58] Field of Search ...................... 350/96 C, 96 WG

[56] References Cited
UNITED STATES PATENTS

| | | | |
|---|---|---|---|
| 3,529,205 | 9/1970 | Miller | 350/96 WG X |
| 3,589,794 | 6/1971 | Marcatili | 350/96 WG |
| 3,753,157 | 8/1973 | Ash et al. | 350/96 C X |
| 3,785,717 | 1/1974 | Croset et al. | 350/96 WG |
| 3,836,348 | 9/1974 | Sumimoto et al. | 350/96 WG X |

*Primary Examiner*—David H. Rubin
*Attorney, Agent, or Firm*—R. S. Sciascia; G. J. Rubens; J. W. McLaren

[57] ABSTRACT

Light energy is coupled between a first optical path including a first channel optical waveguide defined by a selected material diffused into a substrate and a second optical path including a second channel optical waveguide defined by a selected material diffused into the same substrate. The two channel optical waveguides are disposed in substantially non-coupling, co-extensive proximity on the substrate. An area of the same substrate between the two channel optical waveguides is diffused with a material for inducing a determinable degree of coupling between the two optical waveguides but is of insufficient depth of diffusion to support light wave propagation in and of itself in the manner of an optical waveguide. By selectively and controllably varying the amount of diffusion between the channel optical waveguide optimum efficiency of coupling may be achieved therebetween with a desirably high degree of precision through the use of relatively simple and inexpensive fabrication techniques.

5 Claims, 5 Drawing Figures

OPTICAL WAVEGUIDE COUPLER

BACKGROUND OF THE INVENTION

In optical communications and data transmission systems it is frequently required to couple light energy out of an optical path carrying signal information and also to controllably and selectively modulate the light energy propagating along such an optical path. In the prior art, light energy has been coupled out of an optical path in such systems through the use of a grating coupler, employing a periodic diffraction grating on the surface of the material which comprises the optical path, such as the core area of a fiber optic cable having the cladding removed.

Another prior art alternative technique employed to couple light out of an optical path is the use of a prism coupler. The prism coupler technique is practiced by situating a prism at a certain critical distance proximate to the optical path so that frustrated photo reflection is upheld. In a practice of this latter technique the magnitude of light leakage is dependent upon the thickness and refractive index of a material which comprises the optical path, the refractive index of the prism and the waveguide, the angle of the incident beam, and the wavelength of the light energy involved, as well as its plane of polarization. The critical dependence upon these several parameters in the employment of the prism type optical coupler gives rise to a number of disadvantages; these include (1) critical air gap tolerance (2) only one state of operation unless very sophisticated mechanical placement devices are used to move the prism in and out relative to the optical path, and (3) data rate limitation for an active device.

Inherent in all such devices also is the very important and basic problem of an extremely high degree of criticality of dimensional tolerances involving measurements of a microscopic order or less. This basic problem inheres particularly in the fabrication, use, and operation of optical waveguides fabricated by conventional diffusion and deposition techniques, for example.

Previously described techniques for fabrication of optical waveguides having a pre-established specified coupling coefficient between them relied upon extremely precise control of the spatial disposition in the form of separation between the waveguides. Moreover, the coupling coefficient is an extremely sensitive function of waveguide separation for the close proximities required to achieve satisfactory coupling. The very stringent dimensional tolerances required for the fabrication of such optical couplers cannot be achieved satisfactorily with a simple photolithographical fabrication technique, for example.

Additionally, coupling between two co-extensive waveguides could only be changed in prior art practices in different parts of the same device by varying the waveguide separation. Thus, the regions of changing separation are in effect transition portions between no coupling and coupling with the result that the total coupling between the waveguides becomes less well defined for design purposes because of the presence of such transition regions.

Accordingly, there is a need for an optical coupler between two optical paths comprising optical waveguides in which the degree of coupling is readily controllable to a high degree of precision through the use of fabrication methods and techniques which avail of significantly less stringent dimensional tolerances than the methods and techniques known and used in functionally comparable prior art devices.

For instance, the concept and teaching of the present invention avoids the requirement for strict tolerances involving extremely small separations between co-linear, co-extensive optical waveguides in the prior art which required the use of scanning electron microscope techniques to achieve optimum designs and satisfactory performance.

SUMMARY OF THE INVENTION

One of the principal advantages of the optical coupler-modulator as conceived and taught by the present invention is its ease of fabrication in that the requisite dimensional tolerances facilitate the employment of relatively simple and uncomplicated techniques such as photolithography in the required fabrication. The present invention conceives two co-linear and co-extensive channel optical waveguides such as may be fabricated by the diffusion of a suitable selected material into an appropriate II–VI compound substrate or glass substrate material employing known masking techniques. The refractive index of the two co-linear, co-extensive diffused regions is sufficiently greater than that of the substrate to support the independent propagation of light energy along such diffused regions. However, the two co-extensive, co-linear channel optical waveguides are fabricated as close together as possible, but sufficiently spaced so that there is negligible coupling of optical energy between them.

By the use of conventional photolithography techniques, for example, a suitable mask may be fabricated so that a second diffusion of a selected material can be made into an area of the substrate between the two optical waveguides. Such diffusion is accomplished to induce a determinable degree of coupling between the two channel optical waveguides but is controlled so as to be of insufficient depth to support light wave propagation within that region.

Accordingly, the concept of the present invention contemplates the control the degree of optical coupling between two proximate optical paths, such control being consistent with and a function of the degree and extent of diffusion of a suitable material between the two optical paths. The major advantage of the concept of the present invention is that the desired diffusion increase in the refractive index to a readily controllable degree over a determinable length between the two optical paths may be given effect by easily practiced techniques such as photolithography, for example. This highly advantageous aspect of the present invention is in marked contrast to known prior art practices such as those which depended upon extremely stringent spatial separation to produce the desired degree of coupling.

Moreover, as will be apparent to those skilled and knowledgeable in the pertinent arts, the degree of coupling between two optical paths which is given effect in accordance with the teaching and practices of the present invention is not fixed irrevocably but may be subsequently altered as desired by further additional diffusion subsequent to the initial diffusion of a suitable material into the area between the optical paths producing a higher index of diffraction therebetween and inducing the desired degree of optical coupling without in and of itself supporting light propagation in the manner of an optical waveguide.

As will be apparent to those skilled and knowledgeable in the pertinent arts the concept and teaching of the present invention extends beyond its coupling function to provide the optimum structure for an electro-optic modulator in a desired optical path.

Accordingly, it is a primary object of the present invention to provide an improved optical coupler-modulator for transferring light energy between first and second optical paths.

Another most important object of the present invention is to provide such an optical coupler which may be fabricated without requiring the adherence to extremely stringent micromeasurements determinative of spatial disposition of its elements.

A concomitant object of the present invention is to provide such an optical coupler modulator which can be fabricated to the use of readily available and practiced techniques of diffusion aided and effectuated by known processes of photolithography.

Yet another important object of the present invention is to provide such an optical coupler-modulator which by reason of its concept and adaptable steps of fabrication may be practiced to provide subsequent changes in the degree and extent of optical coupling as may be desired.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

In accordance with the concept and teaching of the present invention channel optical waveguides may be fabricated by the diffusion of a suitable material into a substrate through the use of an appropriate diffusion mask.

Figure 1:
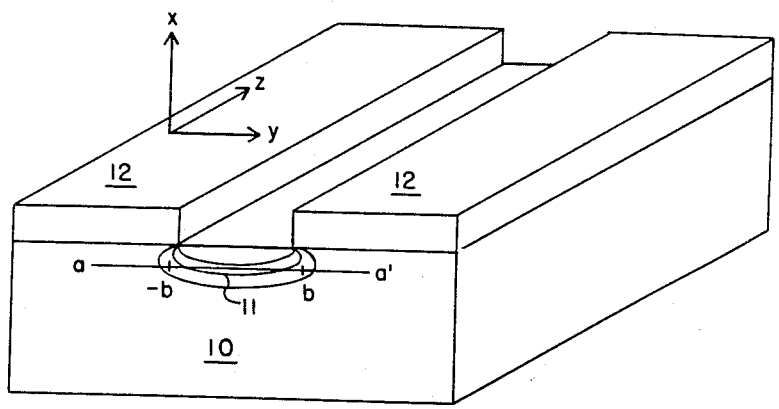
FIG. 1 is a greatly enlarged representation of a type of optical path defined by an optical waveguide as may be employed in the practice of the present invention.

FIG. 1 illustrates a typical geometry employing a $SiO_2$ mask and a diffused optical waveguide. In such a configuration the refractive index of the substrate material 10 is increased in the region where the diffusant 11 has penetrated as represented by the multiple curved lines representing diffused penetration. The extent to which a diffusant penetrates the substrate 10 is confined and controlled by a diffusion mask 12 having right and left portions which restrict the penetration of the diffusant to a channel, thereby producing a channel optical waveguide.

The refractive index of the diffused area $n(x,y)$ is a maximum $nn_m$ at the exposed channel surface and decreases monotonically with increasing distance from the upper surface down into the diffused substrate which has a refractive index of $n_s$.

Optical energy is guided along the $z$ axis of FIG. 1 by reason of the enhanced refractive index produced by the presence of the diffusant in the diffused area of the substrate. The electric and magnetic fields of the energy propagation along the waveguide may be described by Maxwell's equations. These equations show that for a structure such as that illustrated in FIG. 1 the $z$ dependence of the fields of the lowest order mode is $$e^{-i\beta z} \tag{1}$$

where the propagation constant of the mode is bounded by the limits $k_m$ and $k_s$ according to the relationships:

$$k_m = \frac{2\pi}{\lambda} n_m > \beta > \frac{2\pi}{\lambda} n_s = k_s \tag{2}$$

Maxwell's equations, however, can only be solved for the $x$ and $y$ dependent of the electric and magnetic fields with considerable difficulty. But when the change in refractive index is small within the distance of a free space wavelength, the fields behave locally with a close approximation to the expression:

$$e^{i\mathbf{k}^2(x,y) - \beta^2)^{1/2}(dx^2 + dy^2)^{1/2}} \tag{3}$$

Figure 2A:
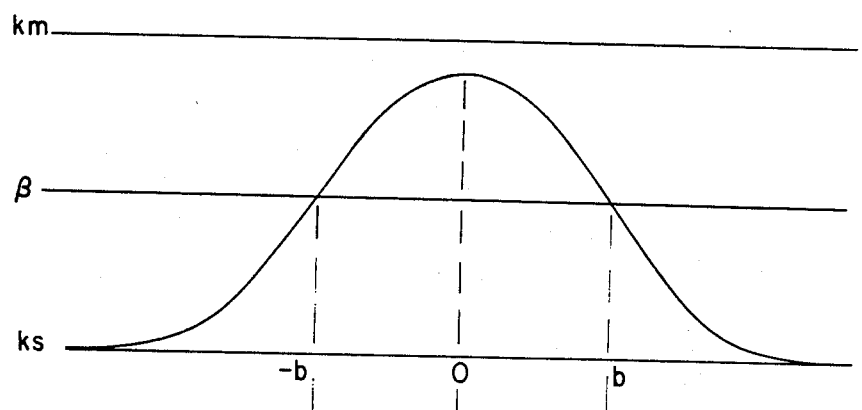
FIGS. 2a and 2b are illustrations of optical characteristics of the optical waveguide illustrated in FIG. 1.
Figure 2B:
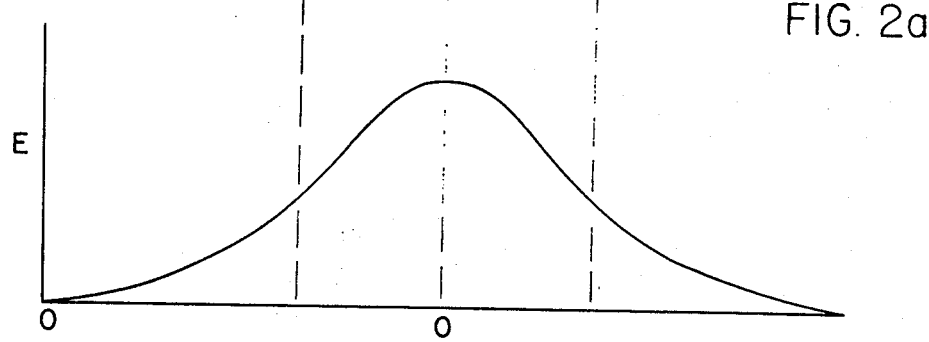

Along the lines $a - a'$ of FIG. 1, $k(x)$ varies as shown in FIG. 2a.

In the region $-b$ to $b$ as indicated in FIG. 1 $k(x,y)$ is greater than $\beta$ and the fields behave in a quasi-sinusoidal manner. Outside the region $k(x,y) < \beta$ and the fields decay exponentially away from the region of the waveguide. The greater the magnitude of $\beta - k(x,y)$, the greater is the rate of the decay.

Figure 3:
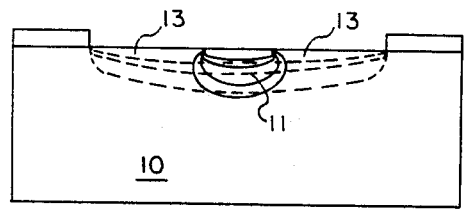
FIG. 3 is a greatly enlarged illustration showing a type of primary and secondary diffusion into a common substrate which may be employed in the present invention.

A second shallow diffusion of a suitable diffusant material as illustrated in FIG. 3 and indicated by the dash lines throughout the region 13 can be used to increase $k(x,y)$ near the surface outside the region of the core of the waveguide. If this secondary diffusion is shallow enough, the waveguide and the propagation constant of the initial diffusions defining the channel optical waveguide will not be significantly perturbed.

In the region 13 where $k(x,y)$ has been increased by the second diffusion and where the associated magnetic and electric fields are decaying quasi-exponentially, the magnitude of $k(x,y) - \beta$ is decreased. The associated electric and magnetic fields decay more slowly with the increased distance from the central portion of the channel optical waveguide in the region indicated by the numerals 13 of FIG. 3 as compared to the illustration of FIG. 1 which does not include the secondary diffusion. In other words, the second diffusion effectively enhances the magnitude of the associated electric and magnetic fields of the channel optical waveguide in the regions indicated by numeral 13.

Figure 4:
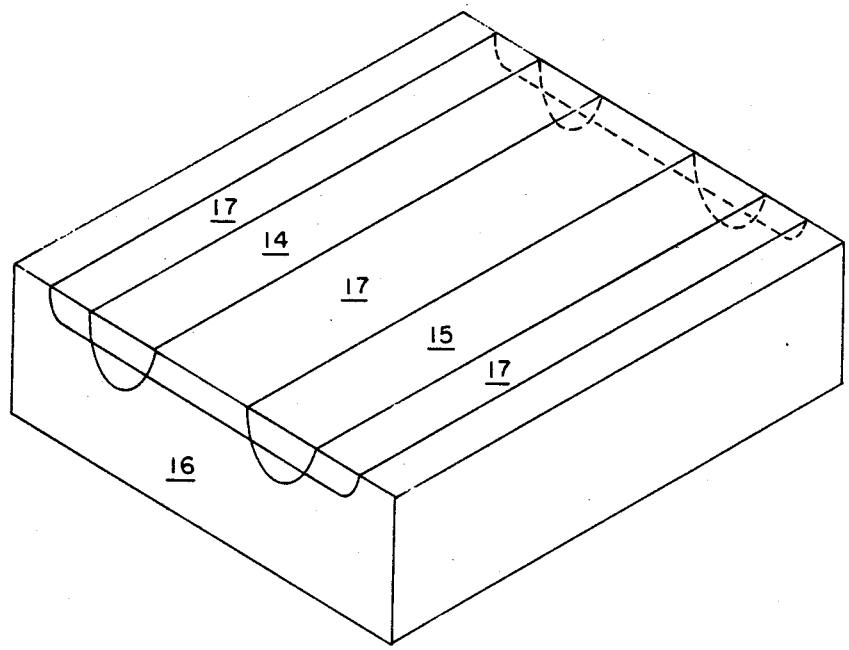
FIG. 4 is a greatly enlarged illustration of an embodiment of the present invention.

The present invention contemplates two similar, but not necessarily identical, channel optical waveguides fabricated co-linearly and co-extensively as shown in the greatly enlarged illustration of FIG. 4. A first channel optical waveguide 14 constitutes a diffused portion of a suitable substrate material 16 to a known and determinable depth increasing the refractive index of the diffused portion 14 so as to provide for light propagation along the diffused region.

Similarly, the second channel optical waveguide 15 is defined by a suitable material diffused into the same substrate 16, increasing the refractive index of the diffused region and providing for light propagation there along. Light energy propagating along one of the channel optical waveguides 14 or 15 will be coupled into the other channel optical waveguide to some essentially negligible degree, more or less, depending upon the spatial proximity of the two channel optical waveguides, the types of materials used, and the depth and extent of diffusion, as well as other specifics of each particular configuration. The magnitude of such coupling may be expressed as a coupling coefficient C in the proportionality $$C \alpha \frac{E_1(x,y)}{E_1^2(x,y)\, da} \frac{E_2(x,y)}{} \frac{da}{E_2^2(x,y)\, da}$$

where $E_1$ is the electric field of the optical energy propagating along one waveguide as if the other waveguide were not present, and $E_2$ is similarly defined as the electric field of optical energy propagating along the second waveguide as if the first waveguide were not present. The numerator of the proportionality (4) and hence C, will be increased if the fields are enhanced in the region in which both fields are present.

Accordingly, a second shallow diffusion as previously discussed and described in connection with the illustration of FIG. 3 may be employed in the area between the adjacent separate fields of the two channel optical waveguides to increase the coupling coefficient therebetween without providing a light propagating path in and of itself.

More specifically, the two co-linear and co-extensive channel optical waveguides 14 and 15 of FIG. 4 may be fabricated by a diffusion of a suitable material such as Cd diffused into ZnSe, Cd diffused into ZnTe, or Cu diffused into LiNiO₃ or many other suitable materials diffused into an appropriate compound, glass, other substrate by known diffusion and masking techniques. The masking may be carried out by the deposition of a suitable and appropriate material such as SiO₂ so that the initial diffusion takes place to create the channel optical waveguide 14 and 15 by reason of creating regions of refractive index which are sufficiently greater than the refractive index of the substrate 16 to support the propagation of light energy therealong. In accordance with appropriate practice, the two channel optical waveguides 14 and 15 are fabricated as close together as possible but are separated enough that there is negligible coupling of energy therebetween.

By the use of appropriate techniques such as photolithography, for instance, a second silicon dioxide mask may be fabricated to control a second diffusion into the substrate 16. The second diffusion of a suitable material encompasses not only the channel optical waveguides 14 and 15 but also the areas indicated by the numeral 17 in the illustration of FIG. 4.

The refractive index of this secondary diffused region is made to be greater than the substrate 16 but may be less than, greater than, or equal to the refractive indices of the regions defining the channel optical waveguides 14 and 15 before the second diffusion step. However, in accordance with the concept and teaching of the present invention, neither the depth of the region of the secondary diffusion, nor the increase in the refractive index caused by the secondary diffusion with respect to that of the substrate 16, is sufficient to support the propagation of optical energy in the form of guided light waves in the region of the secondary diffusion alone.

The evanescent fields of optical energy propagating along the channel optical waveguide 14 and 15 penetrate further into the region 17 therebetween than into the substrate 16 as a result of the increase in refractive index of region 17 over that of the substrate 16 in its undiffused state. Accordingly, the coupling between the two channel optical waveguides 14 and 15 which results from the evanescent field of a light signal guided in one of the waveguides 14 or 15 penetrates to the other waveguide because of the presence of the enhanced coupling region 17 therebetween. In accordance with the concept of the present invention, the depth of the region 17 of the secondary diffusion and the magnitude of the change of the refractive index of that region are easily controlled to a much higher precision, with less stringent requirements by far than spatial optical waveguide separation can be controlled as was necessarily required in order to provide controlled coupling in prior art techniques and devices.

One of the principal and most important advantages of the optical coupler and modulator conceived and taught herein is its ease of fabrication. The dimensional tolerances required are such that only known and readily practiced photolithography techniques are required in diffusion mask preparations. By contrast, the prior art techniques required such strict tolerances on extremely small separations between adjacent approximate optical waveguides that scanning electron microscope techniques were required to achieve optimum designs.

The use of simpler photolithographic technology significantly reduces costs and simplifies fabrication. Additionally, the concept of the present invention affords ease of control of the magnitude of the coupling coefficient between the two adjacent co-linear optical waveguides by controlling the depth of the diffusion into the region therebetween and thereby controlling the magnitude of the change of the refractive index in that region. Therefore, the magnitude of the coupling coefficient may be readily adjusted without changing the mask and this feature is of a great practical and cost advantage in the fabrication of useful devices in accordance with the teaching of the present invention since such masks are not only time consuming to fabricate but are also relatively very expensive.

Obviously many modifications and variations of the present invention are possible in the light of the above teachings. It is therefore to be understood that within the scope of the appended claims the invention may be practiced otherwise than as specifically described.

What is claimed is:

1. A passive coupler for transferring light energy between first and second optical paths comprising:
   a first optical path including a first channel optical waveguide defined by a selected material diffused into a substrate for increasing the refractive index of the diffused region to support independent light wave propagation;
   a second optical path including a co-directional second channel optical waveguide defined by a selected material diffused into said substrate for increasing the refractive index of the diffused region to support independent light wave propagation and disposed in substantially uniformly spaced, coextensive, non-coupling proximity relative to said first channel optical waveguide and, an area of said substrate overlapping the co-extensive portions of said channel optical waveguides and diffused with a material selected for inducing a determinable degree of passive coupling therebetween, but of insufficient depth of diffusion to support independent light wave propagation within said area.

2. A coupler for transferring light energy between first and second optical paths as claimed in claim 1 wherein said first and second channel optical waveguides are disposed in parallel relationship.

3. A coupler for transferring light energy between first and second optical paths as claimed in claim 1 wherein said first and second channel optical waveguides are identical.

4. A coupler for transferring light energy between first and second optical paths as claimed in claim 1 wherein different selected materials are diffused into said substrate to define said first and second channel optical waveguides.

5. A coupler for transferring light energy between first and second optical paths as claimed in claim 1 wherein the material diffused into said substrate in the area between said channel optical waveguides is the same as the diffusant defining at least one of said channel optical waveguides.

* * * * *